US012565052B2

(12) United States Patent
Go et al.

(10) Patent No.: US 12,565,052 B2

(45) Date of Patent: Mar. 3, 2026

(54) DETACHABLE MEDIA DOOR

(71) Applicant: Hand Held Products, Inc., Charlotte, NC (US)

(72) Inventors: Florante Sumalinog Go, Singapore (SG); Arnel Bartulaba Matunog, Singapore (SG); Jennelyn Requinto, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 144 days.

(21) Appl. No.: 18/371,011

(22) Filed: Sep. 21, 2023

(65) Prior Publication Data

US 2025/0100309 A1 Mar. 27, 2025

(51) Int. Cl.
*B41J 29/13* (2006.01)
*E05D 7/10* (2006.01)

(52) U.S. Cl.
CPC ............ *B41J 29/13* (2013.01); *E05D 7/1044* (2013.01)

(58) Field of Classification Search
CPC ........................................................ B41J 29/13
See application file for complete search history.

(56) References Cited

U.S. PATENT DOCUMENTS

| | | | | |
|---|---|---|---|---|
| 10,773,527 | B2 | 9/2020 | Watanabe | |
| 2011/0250000 | A1* | 10/2011 | Anderson | B41J 29/00 400/578 |
| 2018/0244087 | A1* | 8/2018 | Celinder | B41J 29/02 |
| 2020/0298574 | A1* | 9/2020 | Takabayashi | B41J 2/17553 |
| 2022/0009253 | A1* | 1/2022 | Oguchi | B65H 16/023 |

FOREIGN PATENT DOCUMENTS

| | | | |
|---|---|---|---|
| KR | 2017-0003551 | U | 10/2017 |
| WO | 2022/036394 | A1 | 2/2022 |

OTHER PUBLICATIONS

Tadviser, "Honeywell PM42", retrieved from the Internet at URL: <https://www.tadviser.ru/index.php/%D0%9F%D1%80%D0%BE%D0%B4%D1%83%D0%BA%D1%82:Honeywell_PM42> on Jan. 2, 2024, 1 page.
CN Notice of Allowance Mailed on Jun. 23, 2025 for CN Application No. 202422078122, 2 page(s).
CN Office Action Mailed on Apr. 29, 2025 for CN Application No. 202422078122, 1 page(s).
English translation of CN Notice of Allowance dated Jun. 23, 2025 for CN Application No. 202422078122, 2 page(s).
English Translation of CN Office Action dated Apr. 29, 2025 for CN Application No. 202422078122, 1 page(s).

* cited by examiner

*Primary Examiner* — Scott A Richmond
(74) *Attorney, Agent, or Firm* — Alston & Bird LLP

(57) ABSTRACT

A printer or other machine providing tangible outputs are provided. The printer comprises a base unit defining a storage compartment configured to house a printing mechanism of the printer. The printer includes a detachable cover movably attached to the base unit via one of a first pivoting mechanism and a second pivoting mechanism. The detachable cover is configured to be pivoted about a first pivoting axis defined by the first pivoting mechanism for moving the detachable cover in a first opening direction. The detachable cover is configured to be pivoted about a second pivoting axis defined by the second pivoting mechanism for moving the detachable cover in a second opening direction different from the first opening direction.

11 Claims, 21 Drawing Sheets

DETACHABLE MEDIA DOOR

FIELD OF THE DISCLOSURE

Example embodiments of the present disclosure relate generally to media doors, and more particularly to the media door having two opening directions.

BACKGROUND OF THE DISCLOSURE

Printers are widely used for printing labels, bar codes etc. Printers, such as industrial printers or household printers are compactly designed to occupy the least amount of space and therefore provide economic benefits to the users. Further, the industrial printers operate extensively for longer hours to sustain the requirements of an industry. Therefore, a small buffer space is provided for accessing various internal components of these printers such as ribbon rewind, ribbon supply, media supply which are required to be serviced regularly for maintaining the efficiency of the printers. In order to access these printers, a user is required to open a media door. The media door comes in various shapes and sizes and is bolted with main body of the printer.

However, the media door requires a bigger opening area around the printer to allow access to the printer apart from the buffer space. In case the media door has a side opening mechanism, the media door requires large side volume space of the printer to open completely. Similarly, in case the media door has a top opening mechanism, the media door requires large top volume space of the printer to open completely. Currently, media door available with the printers do not provide the users to choose between the top opening door or the side opening door. Further, the media door currently available with the printer requires different tools to detach the media door from the printer, since some users prefer to use the printer without the media door.

Applicant has identified a number of deficiencies and problems associated with conventional printing apparatuses. Through applied effort, ingenuity, and innovation, many of these identified problems have been solved by developing solutions that are included in embodiments of the present disclosure, many examples of which are described in detail herein.

SUMMARY OF THE DISCLOSURE

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a printer is disclosed. The printer comprising a base unit defining a storage compartment configured to house a printing mechanism of the printer. The printer further comprising a detachable cover movably attached to the base unit via one of a first pivoting mechanism and a second pivoting mechanism. The detachable cover is configured to be pivoted about a first pivoting axis defined by the first pivoting mechanism for moving the detachable cover in a first opening direction. The detachable cover is configured to be pivoted about a second pivoting axis defined by the second pivoting mechanism for moving the detachable cover in a second opening direction different from the first opening direction.

In some embodiments, the first opening direction and the second opening direction corresponds to a top direction movement and a sideward direction movement of the detachable cover with respect to the base unit, respectively. In some embodiments, the detachable cover opens in a bifold configuration or a non-bifold configuration.

In some embodiments, each of the first pivoting mechanism and the second pivoting mechanism includes one or more hinges. The first pivoting mechanism facilitates the one or more hinges to move the detachable cover in the first opening direction. The second pivoting mechanism facilitates the one or more hinges to move the detachable cover in the second opening direction.

In some embodiments, each of the first pivoting mechanism and the second pivoting mechanism includes at least one movable lever having a first end coupled to at least one handle and a second end coupled to at least one spring. The at least one spring is configured to extend or retract, for the movement of the detachable cover.

In some embodiments, the detachable cover having one or more guide members integrated on the at least one at least one movable lever to ensure movement and alignment of the first pivoting mechanism and the second pivoting mechanism.

In some embodiments, the detachable cover is configured to be moved in the first opening direction by disengaging one or more hinges of the first pivoting mechanism by the at least one handle. In some embodiments, the detachable cover is configured to be moved in the second opening direction by disengaging one or more hinges of the second pivoting mechanism by the at least one handle.

In another example embodiment, a machine for providing a tangible output is disclosed. The machine comprising a base unit and a detachable cover attached to the base unit. Further, the machine comprising a first pivoting mechanism attached to the detachable cover. The first pivoting mechanism defining a first pivoting axis, for movement of the detachable cover in a first opening direction. Further, the machine comprising a second pivoting mechanism attached to the detachable cover. The second pivoting mechanism defining a second pivoting axis, for movement of the detachable cover in a second opening direction different from the first opening direction.

In some embodiments, the first opening direction and the second opening direction correspond to a top direction movement and a sideward direction movement of the detachable cover with respect to the base unit, respectively. In some embodiments, the detachable cover opens in a bifold configuration or a non-bifold configuration.

In some embodiments, each of the first pivoting mechanism and the second pivoting mechanism includes one or more hinges. The first pivoting mechanism facilitates the one or more hinges to move the detachable cover in the first opening direction. The second pivoting mechanism facilitates the one or more hinges to move the detachable cover in the second opening direction.

In some embodiments, each of the first pivoting mechanism and the second pivoting mechanism includes at least one at least one movable lever having a first end coupled to at least one handle and a second end coupled to at least one spring.

In some embodiments, the detachable cover is configured to be moved in the first opening direction by disengaging one or more hinges of the first pivoting mechanism by the at least one handle. In some embodiments, the detachable cover is configured to be moved in the second opening direction by disengaging one or more hinges of the second pivoting mechanism by the at least one handle.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

Figure 1:
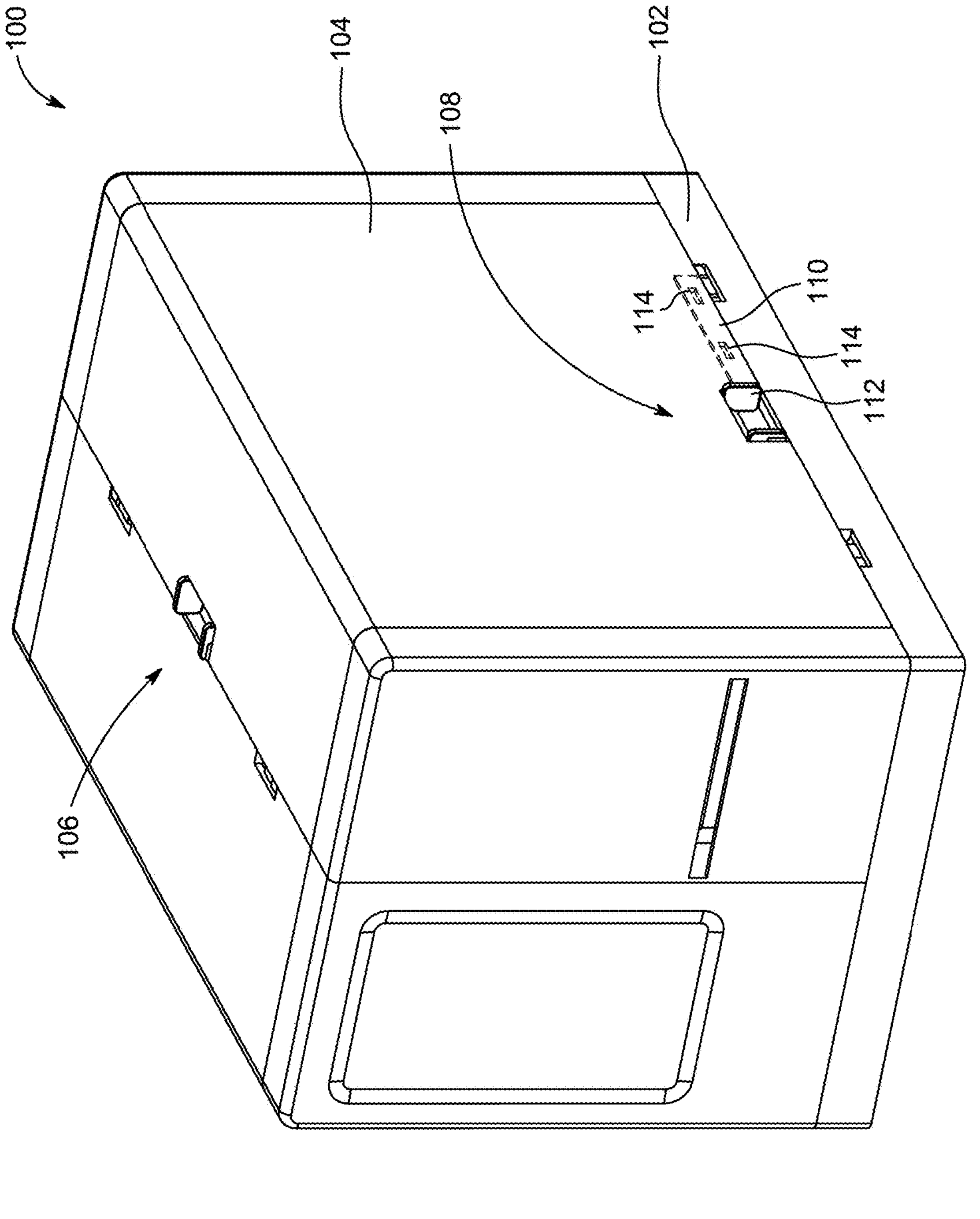
Figure 2A:
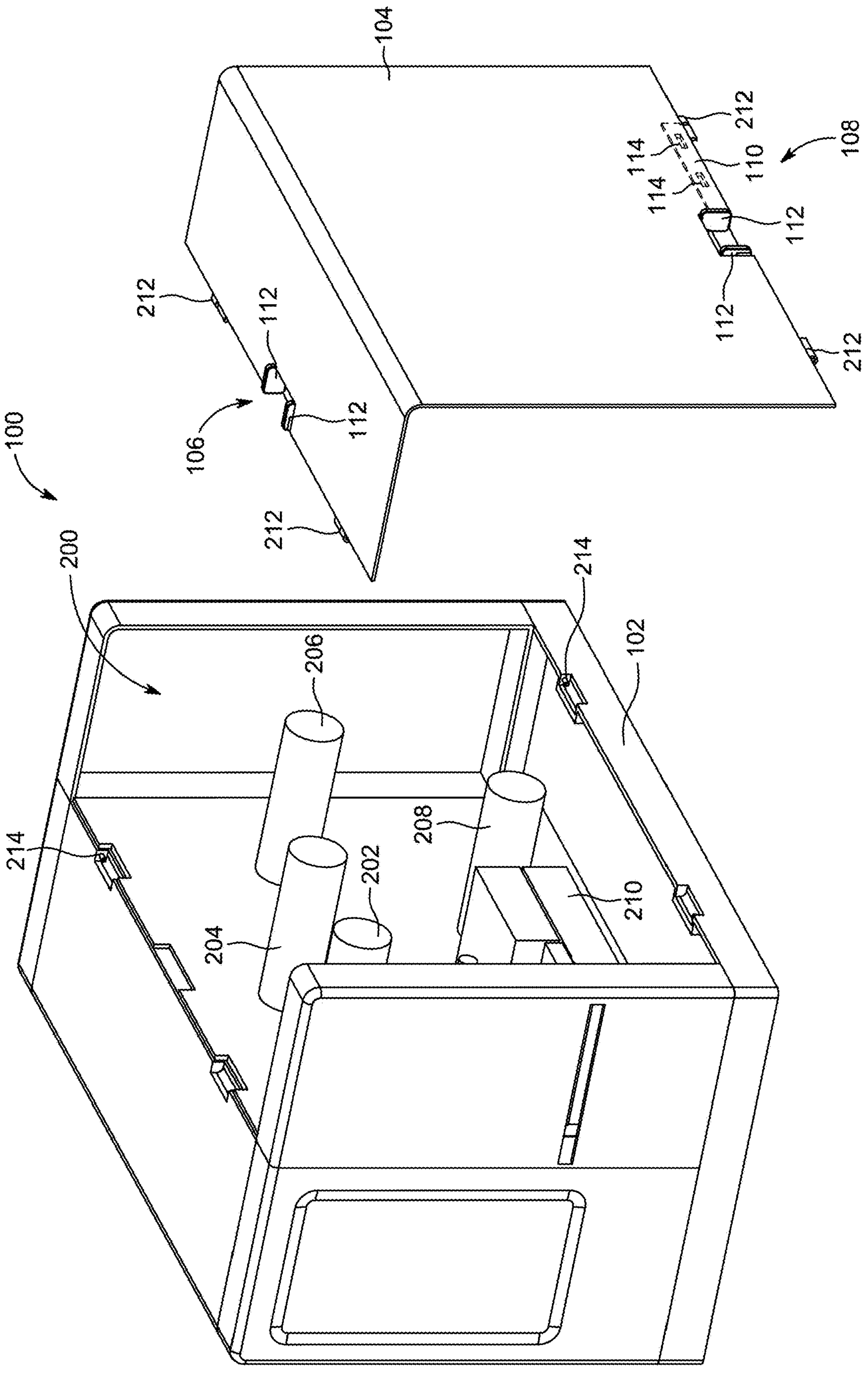
Figure 2B:
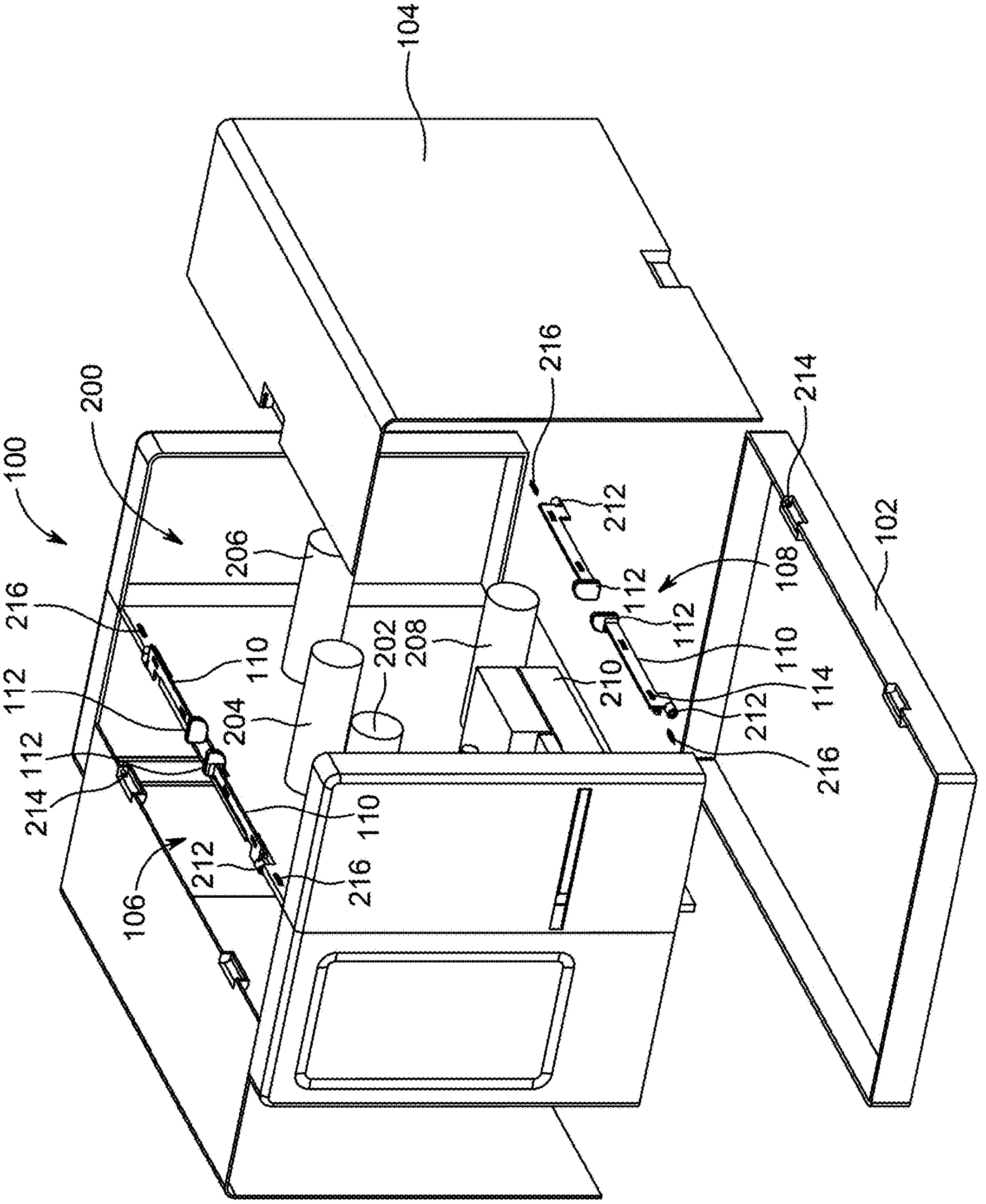
Figure 3A:
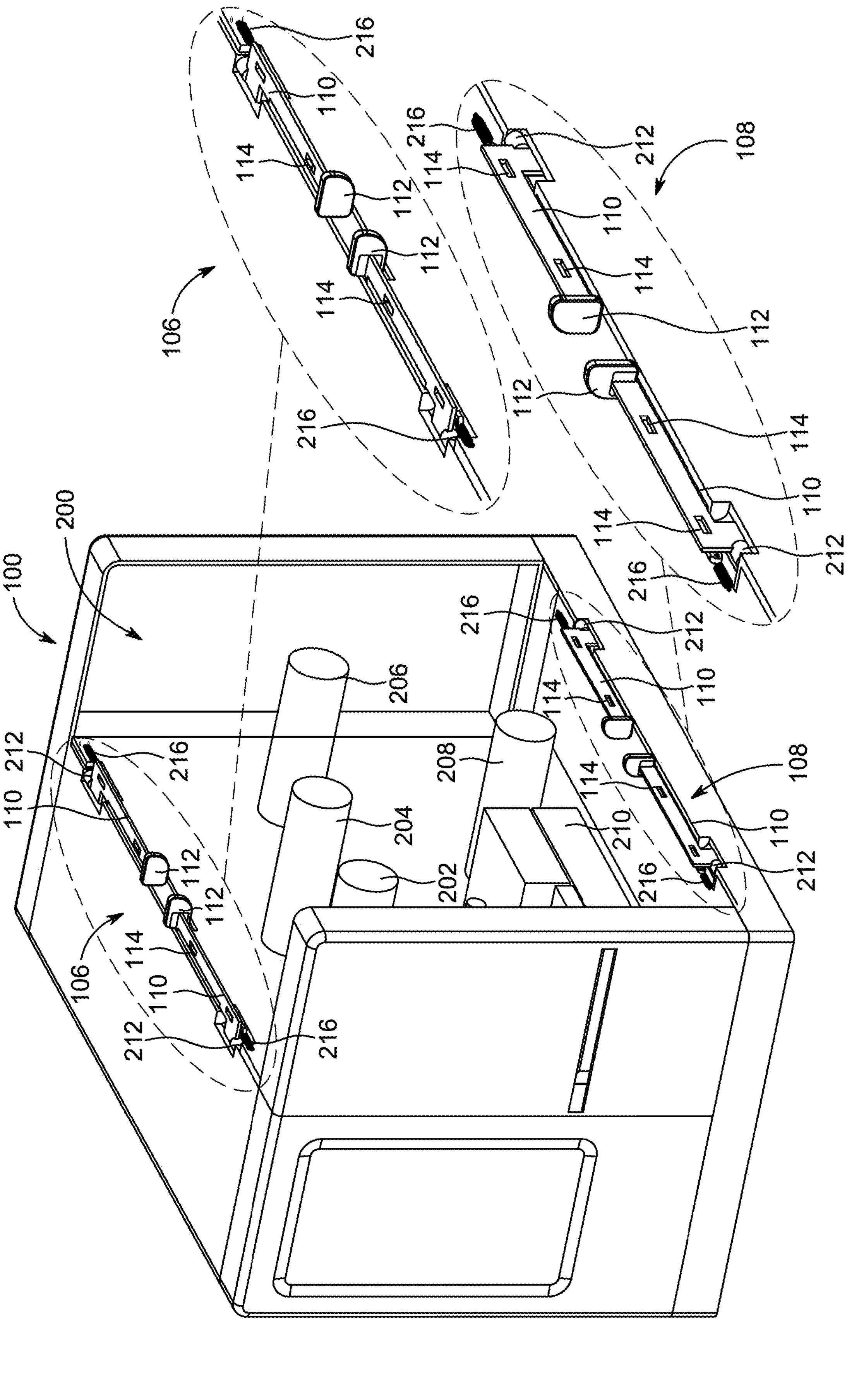
Figure 3B:
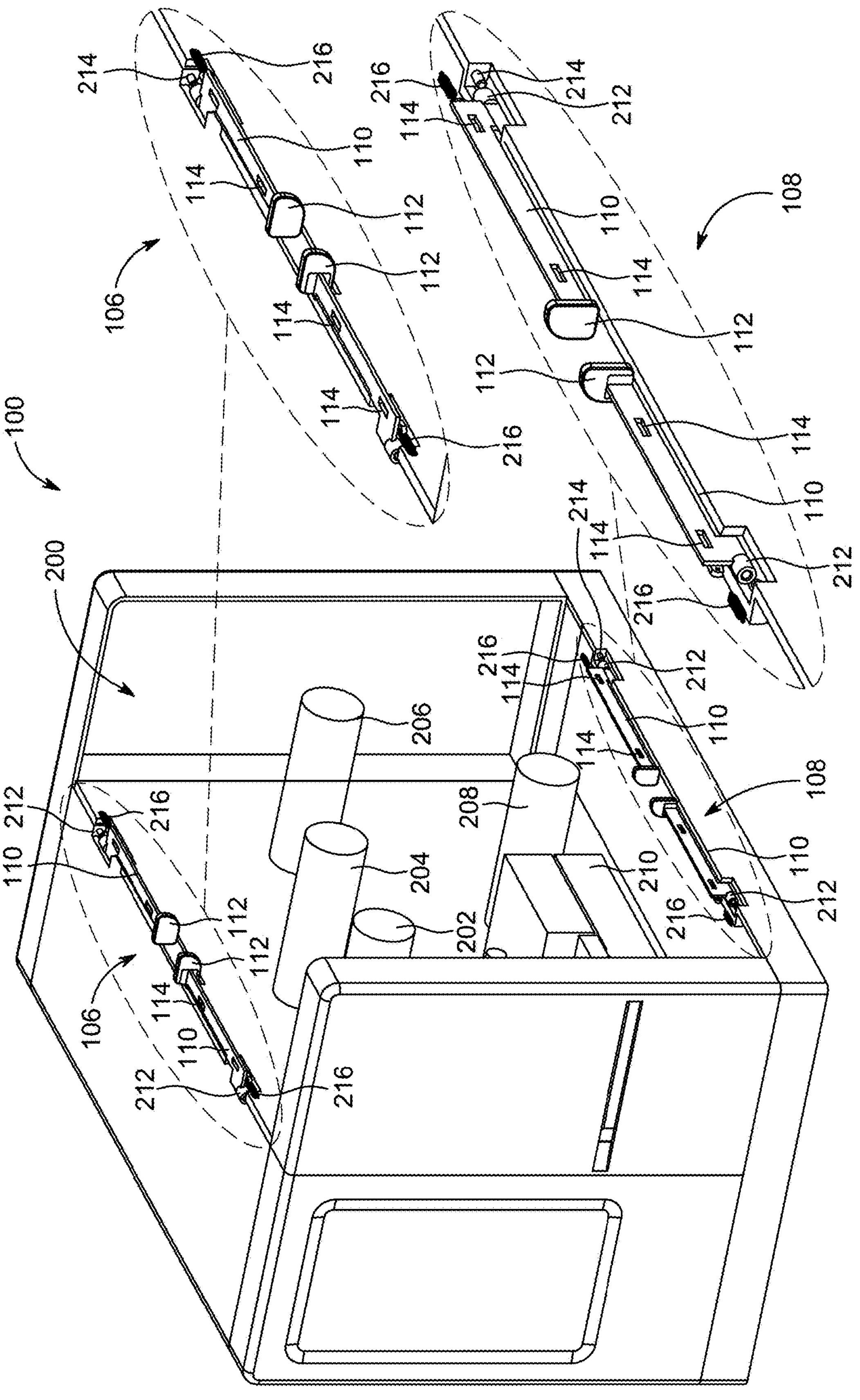
Figure 4:
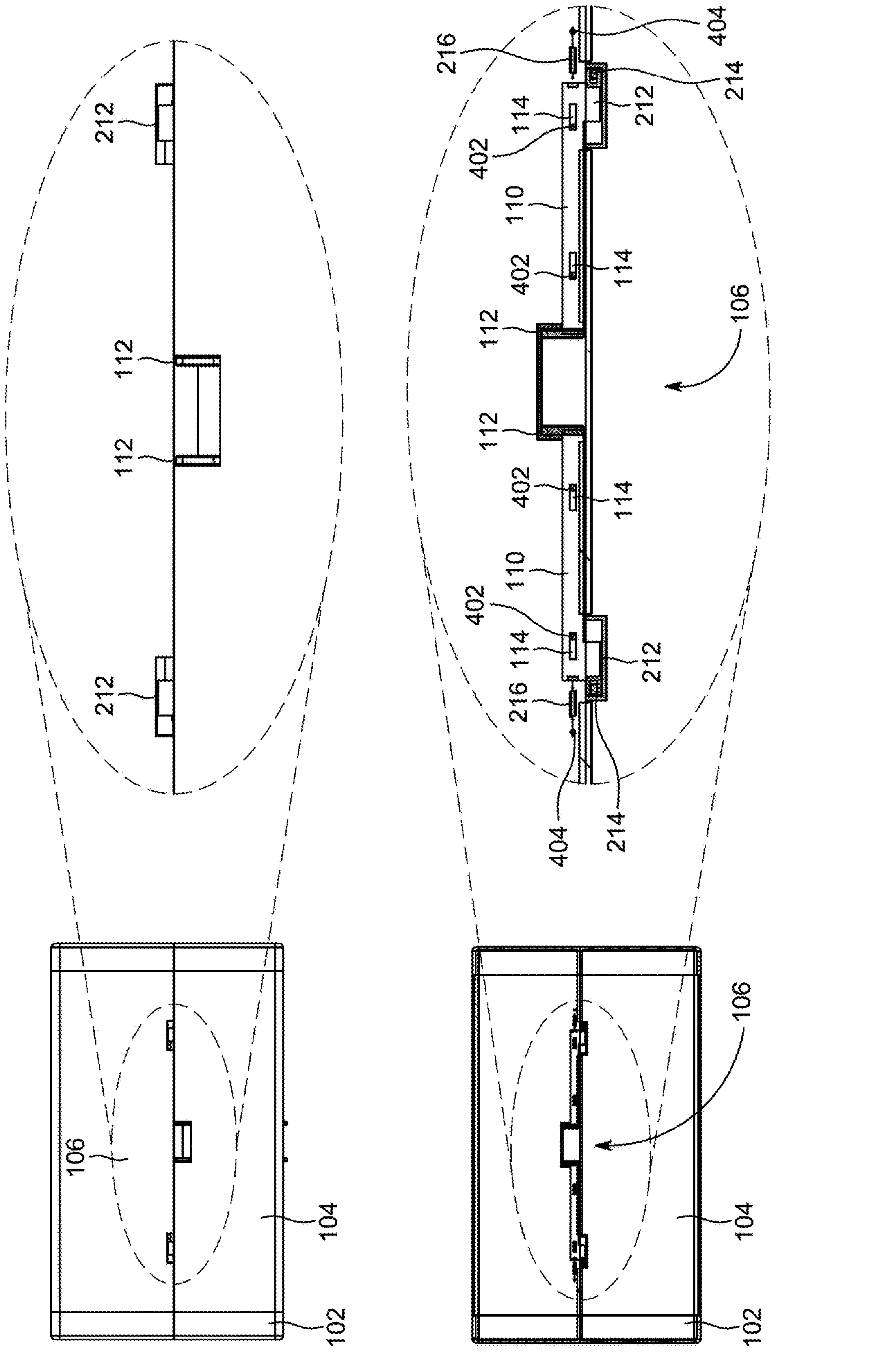
Figure 5A:
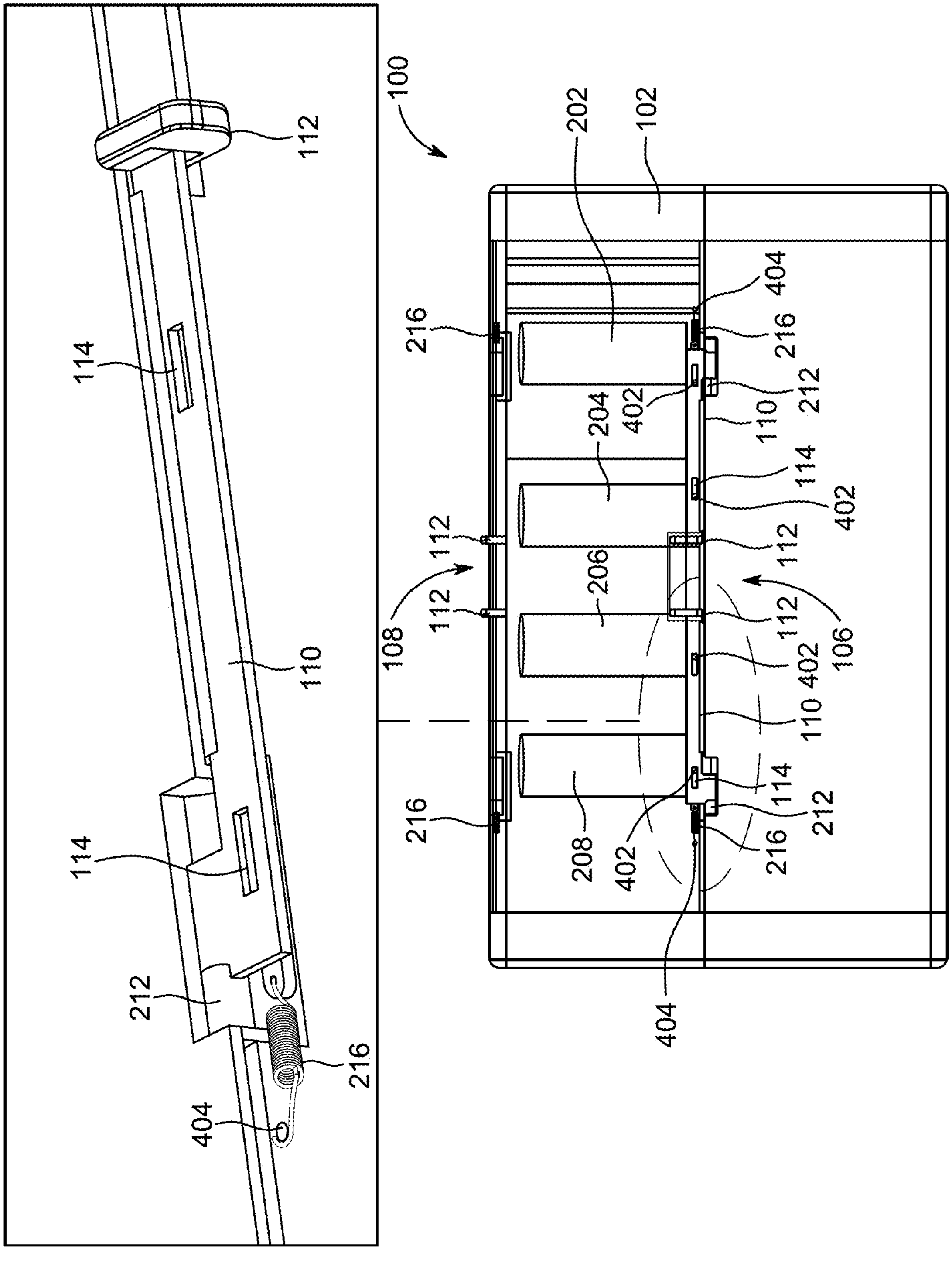
Figure 5B:
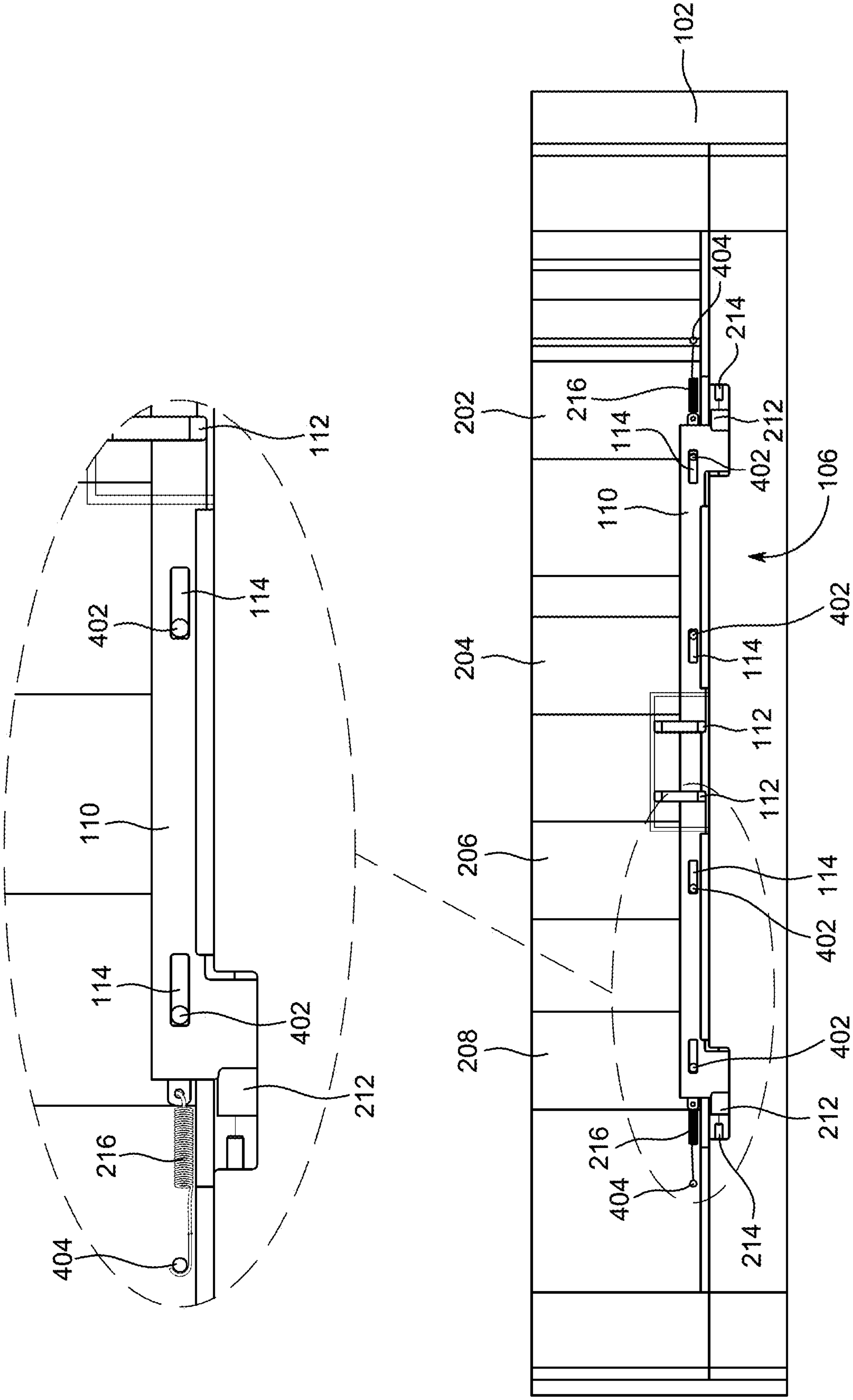
Figure 6A:
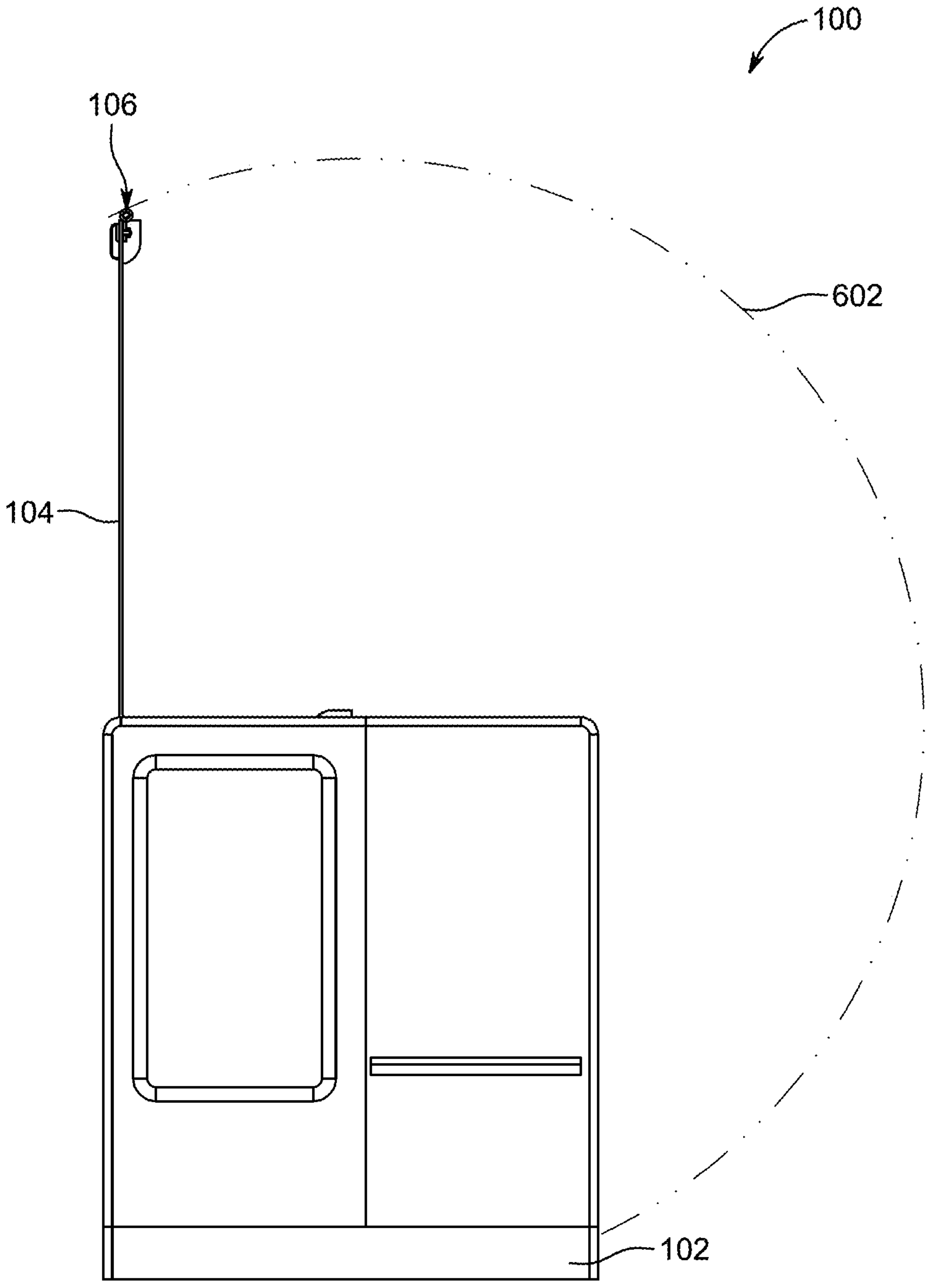
Figure 6B:
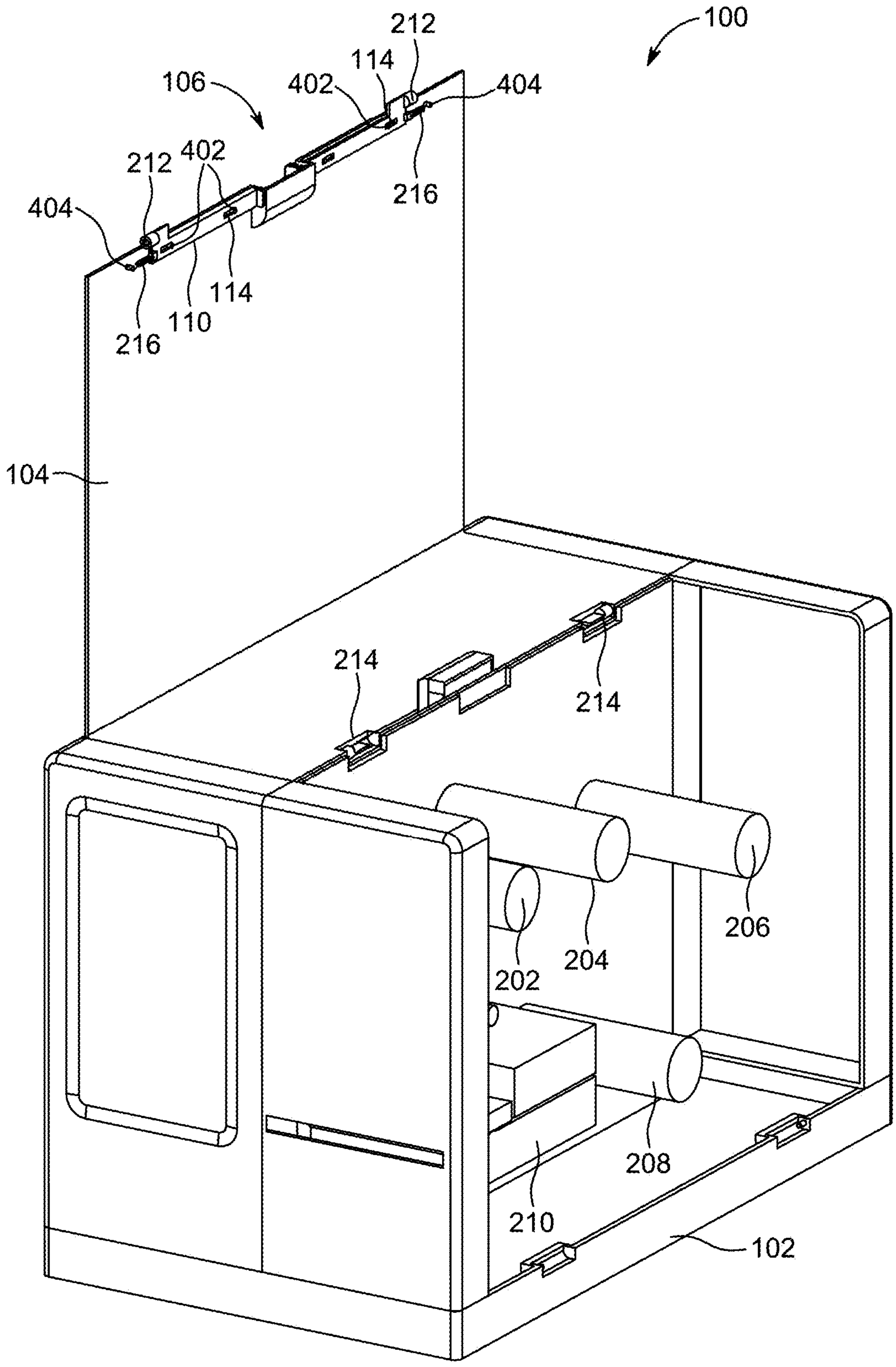
Figure 7A:
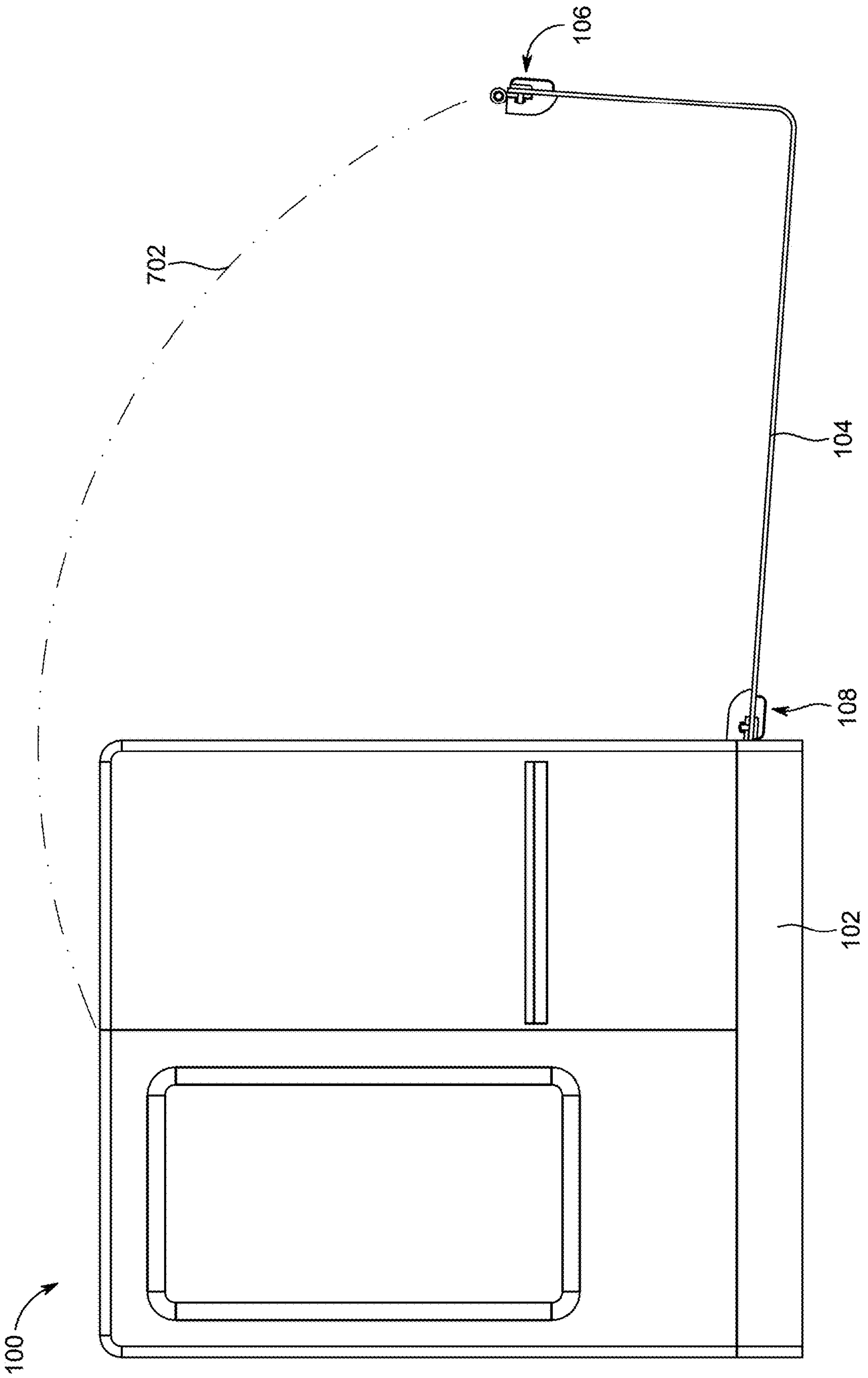
Figure 7B:
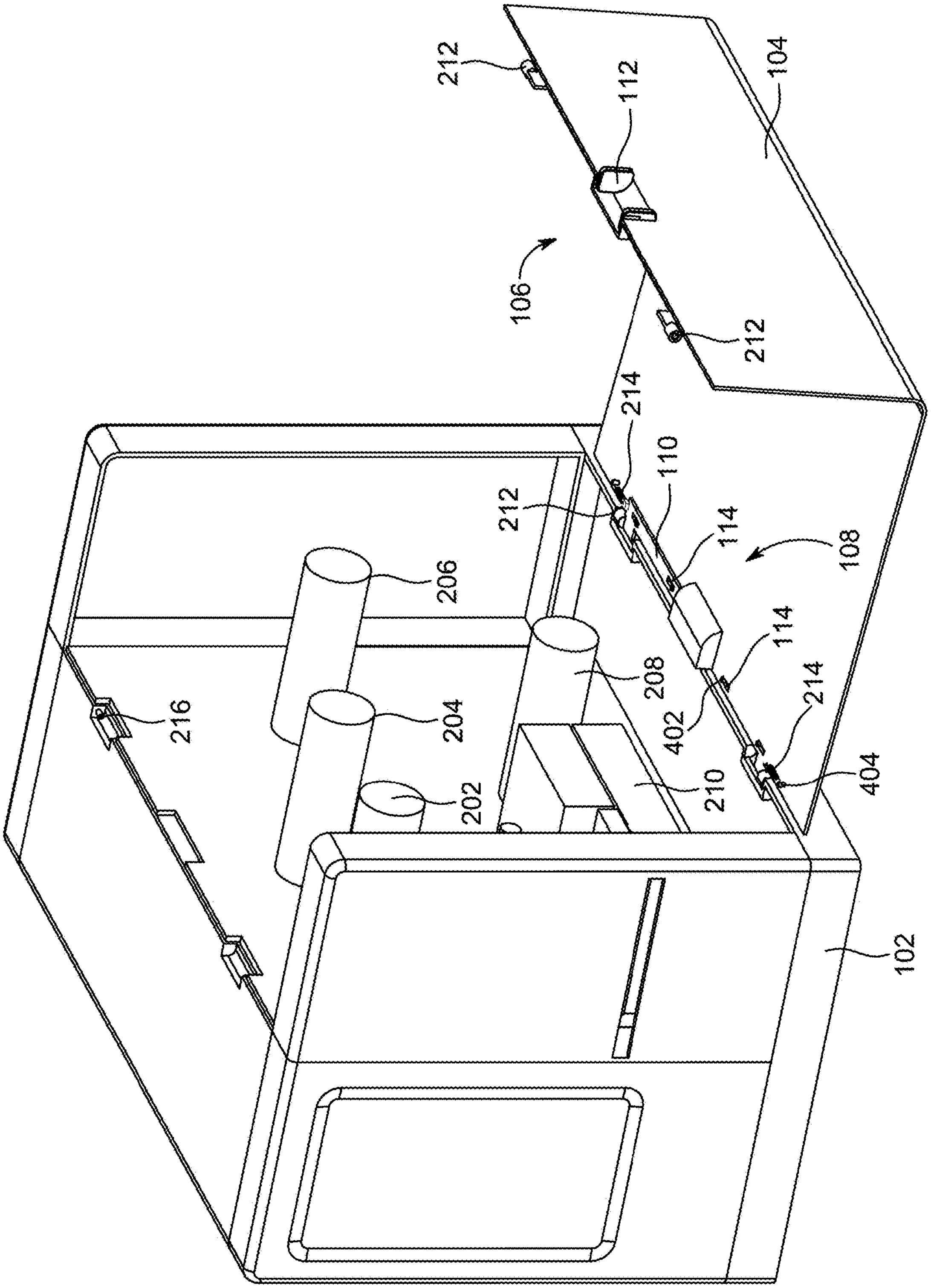
Figure 8A:
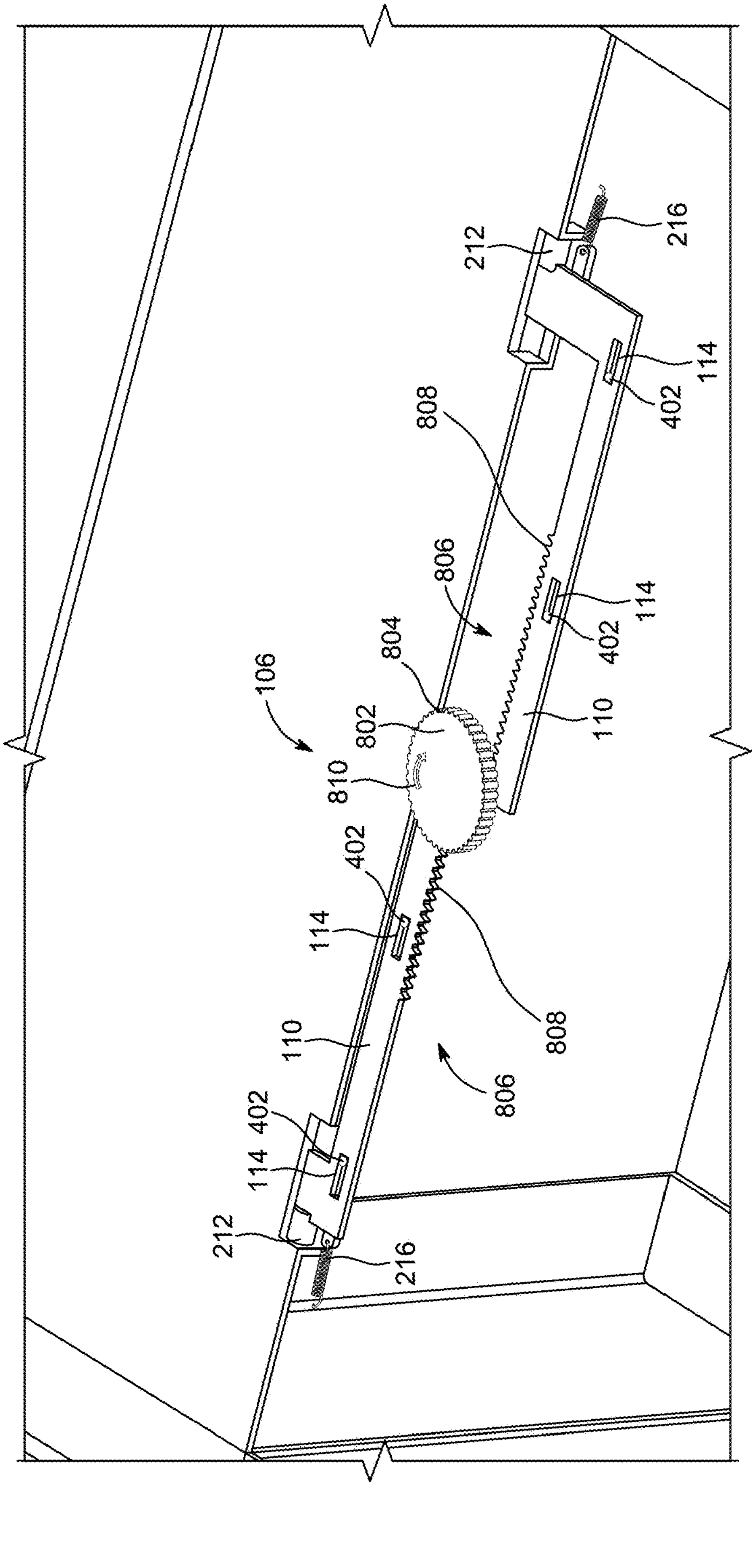
Figure 8B:
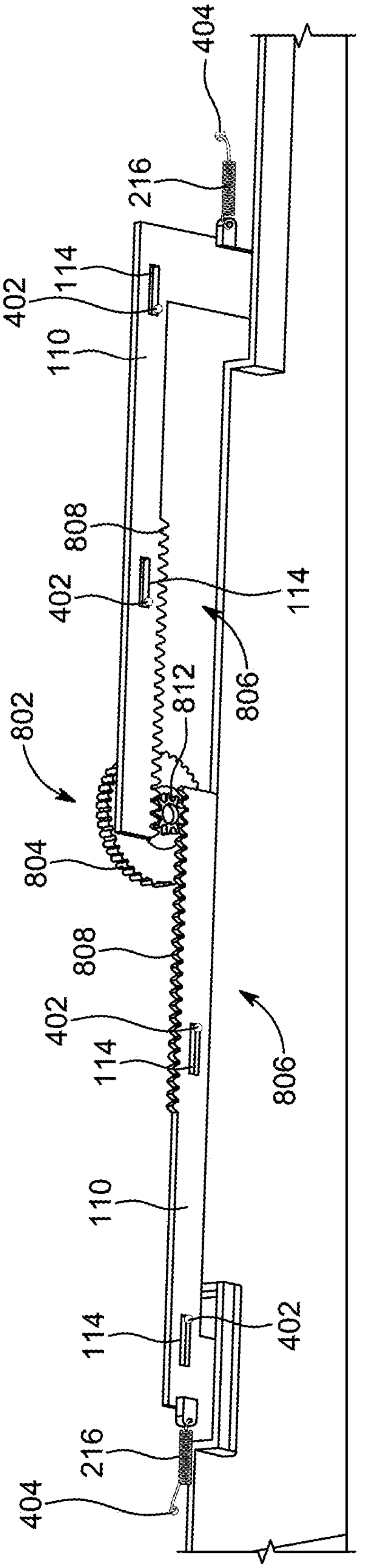
Figure 8C:
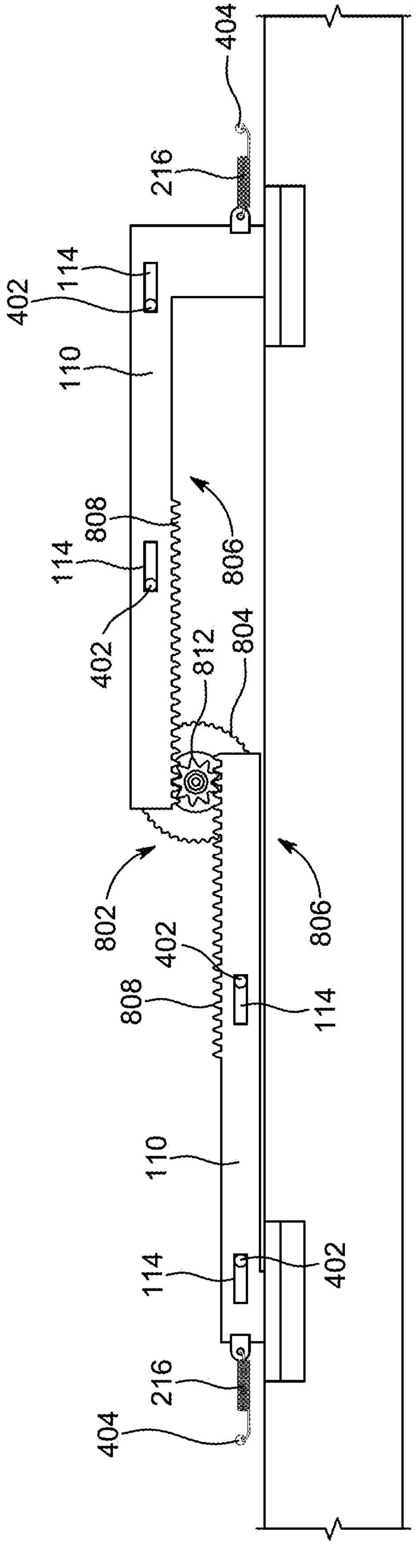
Figure 8D:
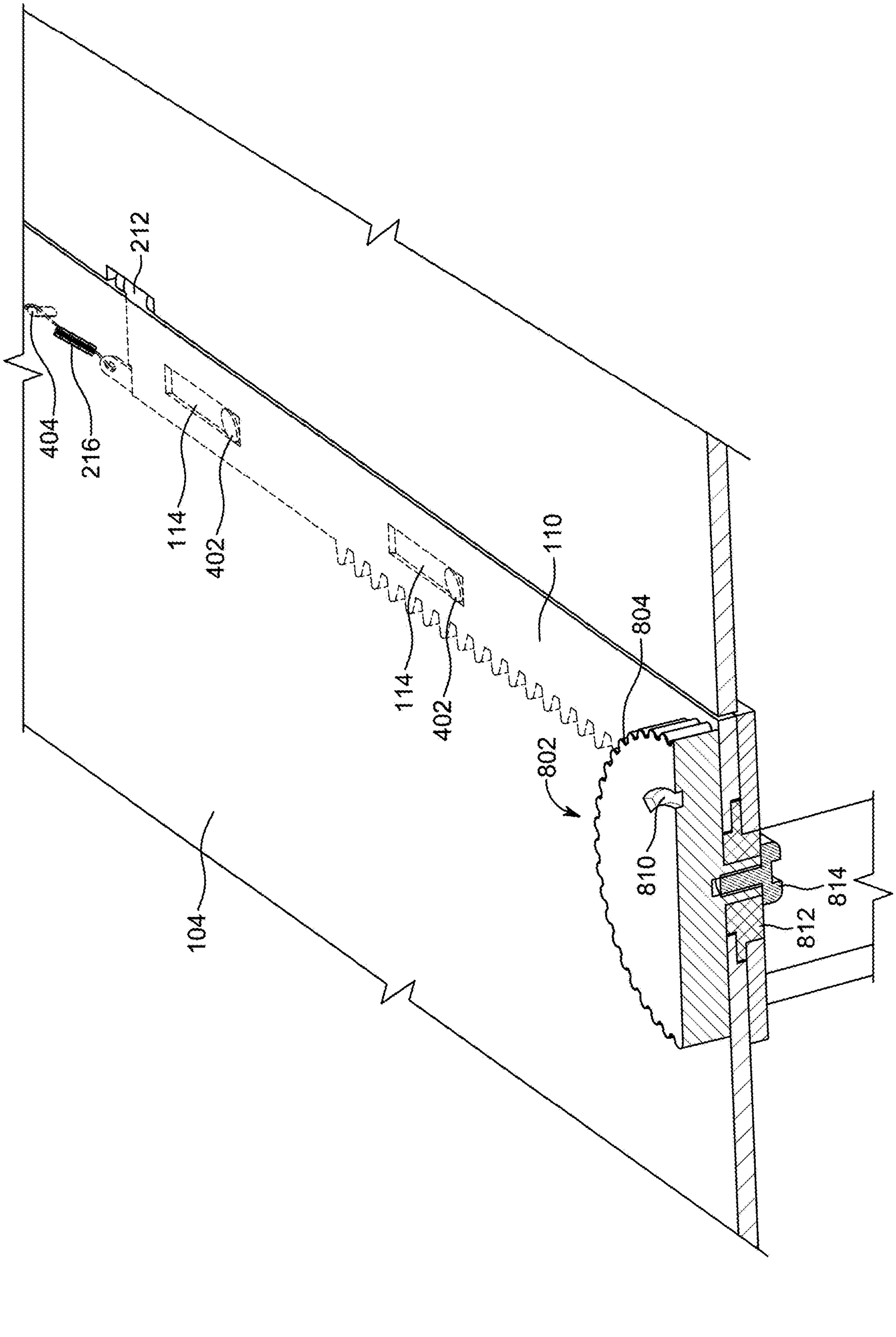
Figure 8E:
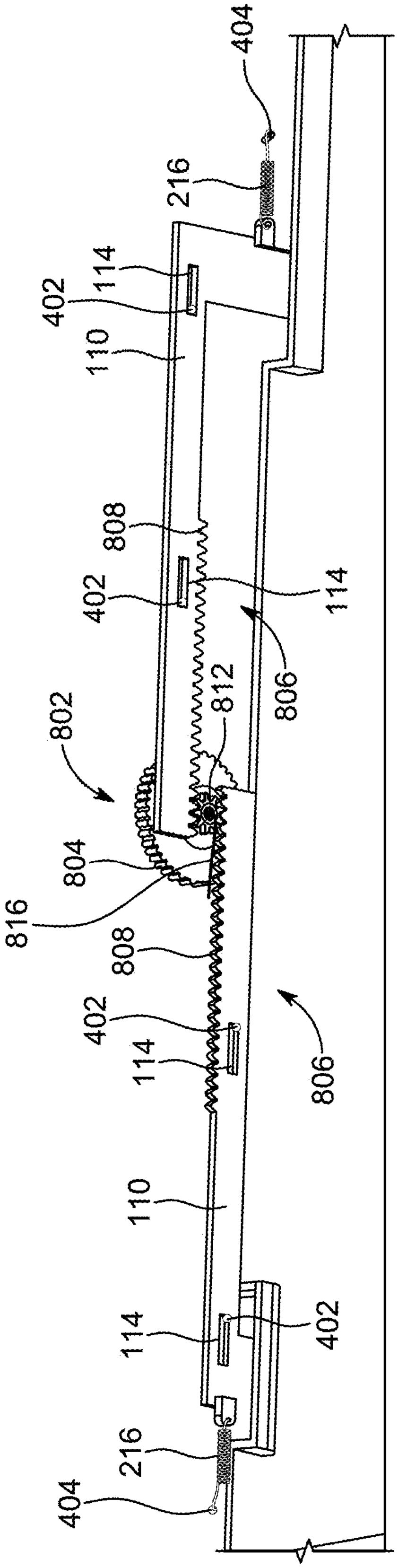
Figure 9A:
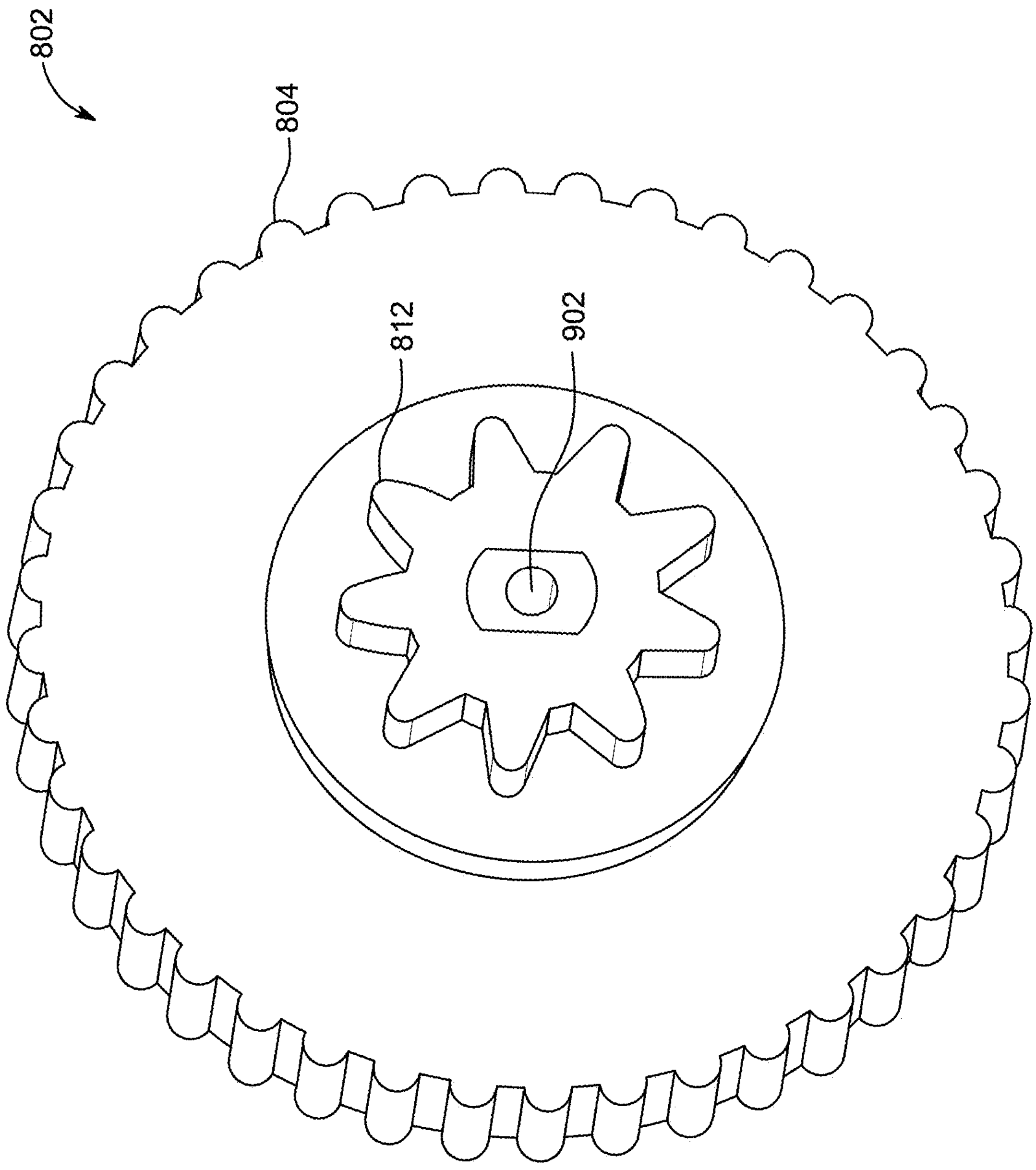
Figure 9B:
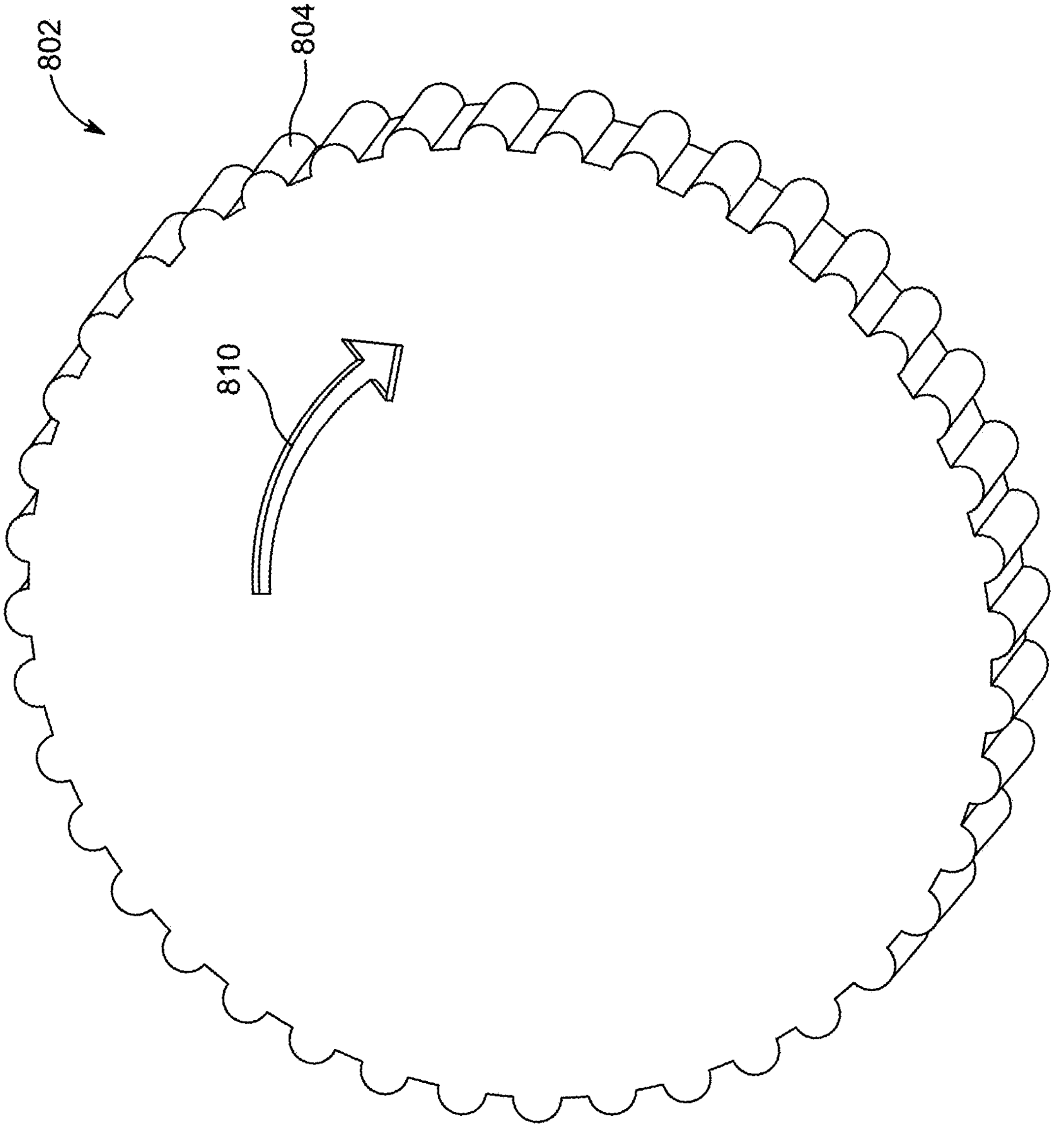
Figure 10A:
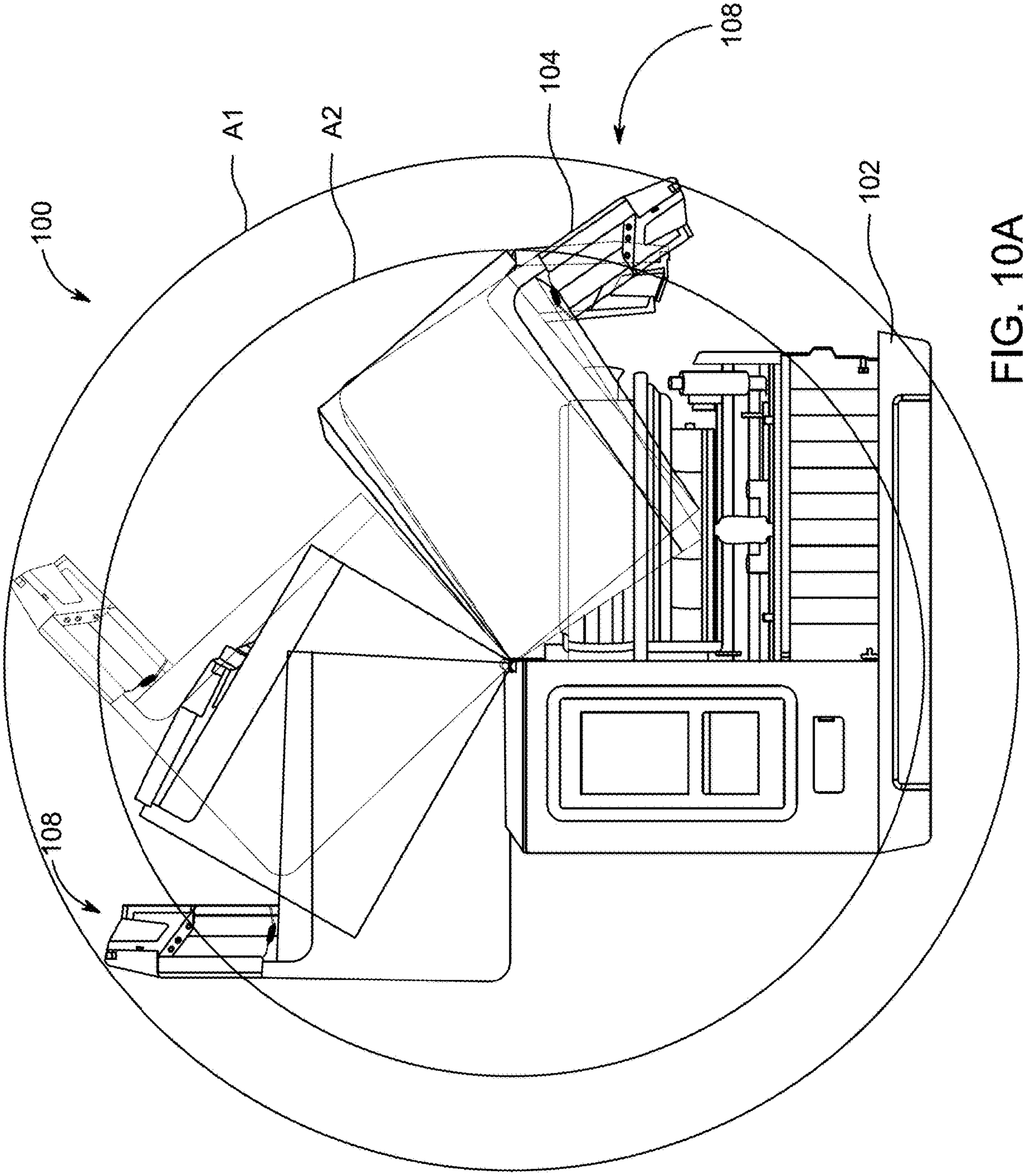
Figure 10B:
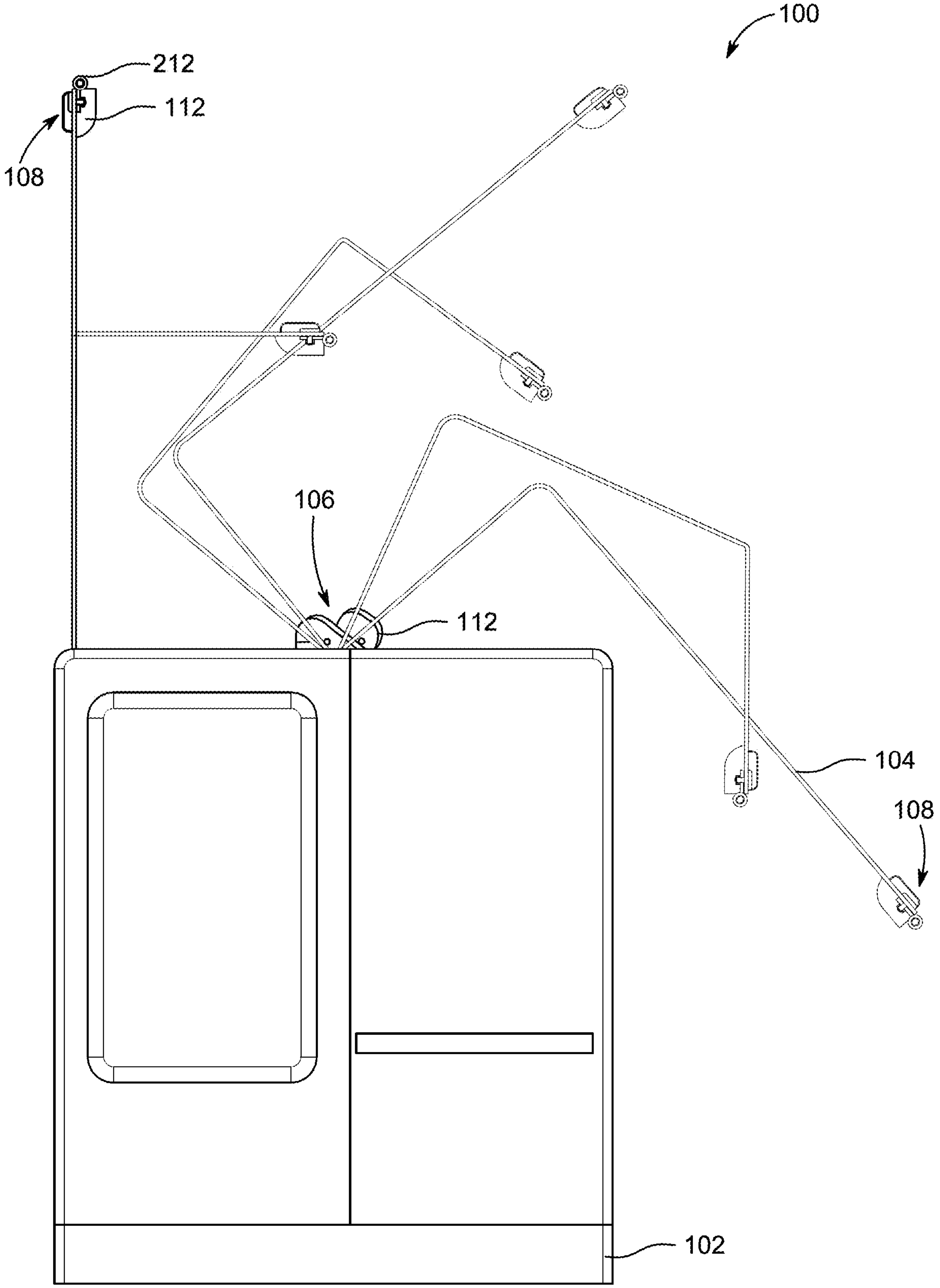
Figure 10C:
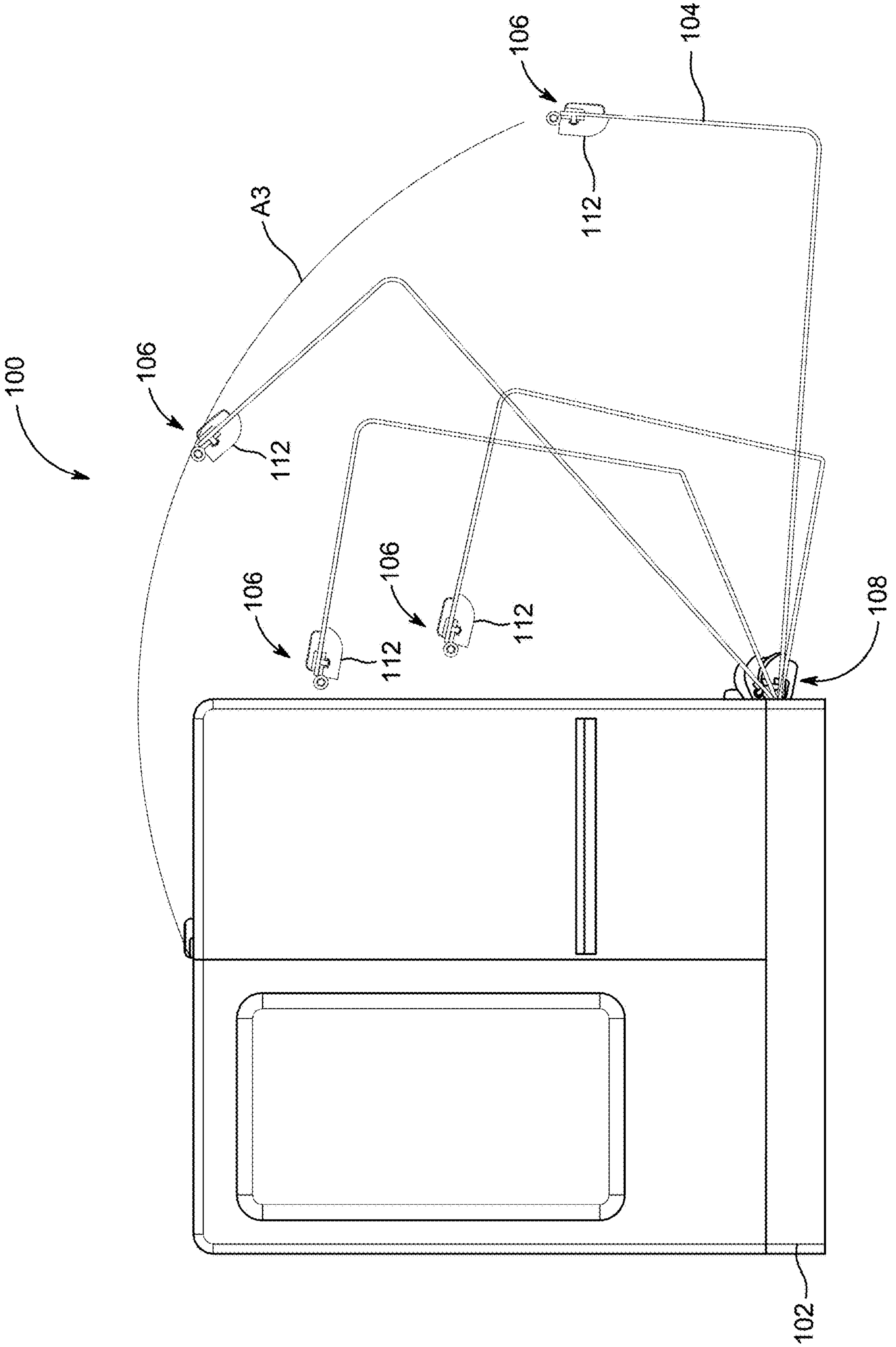

Having thus described certain example embodiments of the present disclosure in general terms, reference will hereinafter be made to the accompanying drawings, which are not necessarily drawn to scale, and wherein:

FIG. 1 illustrates an isometric view of a printer, in accordance with the present disclosure;

FIG. 2A illustrates an isometric view of the printer with a disengaged detachable cover, in accordance with the present disclosure;

FIG. 2B illustrates an exploded view of the printer, in accordance with the present disclosure;

FIGS. 3A-3B illustrate a first pivoting mechanism and a second pivoting mechanism in an engaged position and in a disengaged position, in accordance with the present disclosure;

FIG. 4 illustrates top view of the first pivoting mechanism and the second pivoting mechanism, in accordance with the present disclosure;

FIGS. 5A-5B illustrate the first pivoting mechanism and the second pivoting mechanism in the engaged position and in the disengaged position (media door not shown), in accordance with the present disclosure;

FIG. 6A illustrates a side view of the printer with top direction opening of the detachable cover, in accordance with the present disclosure;

FIG. 6B illustrates an isometric view of the printer with top direction opening of the detachable cover, in accordance with the present disclosure;

FIG. 7A illustrates a side view of the printer with sideward direction opening of the detachable cover, in accordance with the present disclosure;

FIG. 7B illustrates an isometric view of the printer with sideward direction opening of the detachable cover, in accordance with the present disclosure;

FIGS. 8A-8B illustrate an oblique view of the knob coupled with a rack and pinion mechanism (media door not shown), in accordance with the present disclosure;

FIG. 8C illustrates a bottom view of the knob coupled with the rack and pinion mechanism (media door not shown), in accordance with the present disclosure;

FIG. 8D illustrates a cross sectional view of the knob coupled with the rack and pinion mechanism and the detachable cover, in accordance with the present disclosure;

FIG. 8E illustrates an oblique view of the knob attached with a torsion spring (media door not shown), in accordance with the present disclosure;

FIGS. 9A-9B illustrate an oblique view of the knob, in accordance with the present disclosure;

FIGS. 10A-10B illustrate a side view of the printer showing comparison between bifold configuration and non-bifold i.e., one-piece configuration of the detachable cover, in accordance with the present disclosure; and FIG. 10C illustrates a side view of the printer showing comparison between bifold configuration and non-bifold i.e., one-piece configuration of the detachable cover, in the second opening direction, in accordance with the present disclosure.

DETAILED DESCRIPTION

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms “a,” “an,” and “the” herein do not denote a limitation of quantity, but rather denote the presence of at least one of the referenced object. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. Like numerals represent like parts in the figures.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

Various embodiments of the present disclosure are directed to devices such as printers or other machines that have a base unit and a detachable cover. In particular, the detachable cover may be configured to allow a user to access the interior components of the printer such as ribbon rewind, ribbon supply, media supply, which may be easily accessed by the user. For example, regarding implementations of a printer, the user may occasionally need to open the doors of the printer to load paper or other media on which text and images may be printed. Also, the user may need to open the printer to remove jammed supplies, to replace a ribbon or toner cartridge, to replace a drum, or to perform other regular tasks associated with the normal use of the printer. Thus, the present disclosure includes the detachable cover that may be detached from the printer in one or more opening directions and axis points. Such one or more opening direction of the detachable cover may occupy least amount of space while uncovering the printer.

FIG. 1 illustrates an isometric view of a printer 100, in accordance with one or more embodiments of the present disclosure. Although a device depicted in FIG. 1 represents the printer 100, it should be noted that the device may be any type of a machine capable of producing an output similar that of the printer. Specifically, the machine may receive or store one or more products (such as paper, labels, ink, or toner), engage in one or more operations on the one or more goods, and subsequently may generate a physical output. The actual output may be a byproduct or a modified version of one or more of the items. For instance, when the machine corresponds to the printer 100, it may contain ink/toner as well as a media (such as paper, labels, etc.). The machine may transfer a picture to the medium, which the printer 100 may subsequently print out. Other embodiments of the machine may allow it to be a point-of-sale (POS) device, a label maker, a food, or beverage machine, etc. It should be understood that periodically opening a housing of the printer 100 or other devices or machines for producing a physical good may be necessary.

The printer 100 may comprise a base unit 102 and a detachable cover 104. In some embodiments, the base unit 102 may correspond to a working unit of the device or machine incorporating functional elements, such as printing mechanisms in case of the printer 100, over which the detachable cover 104 may be installed. The detachable cover 104 may be movably attached to the base unit 102 via one of a first pivoting mechanism 106 and a second pivoting mechanism 108. It may be noted that the detachable cover 104 may be configured to be pivoted about an axis defined by the first pivoting mechanism 106 and the second pivoting mechanism 108. The first pivoting mechanism 106 and the second pivoting mechanism 108 may operate using one or more elements, such as, at least one movable lever 110, at least one handle 112, and one or more guide members 114 integrated on the at least one movable lever 110. The at least one handle 112 may be operated by a user to slide the at least one movable lever 110 along the axis defined by the first pivoting mechanism 106 and the second pivoting mechanism 108. The one or more guide members 114 may facilitate a planar path for the movement of the at least one movable lever 110. The guide members 114 may facilitate the planar path of the at least one movable lever 110 with the help of a plurality of pins (not shown). The working of the plurality of pins in conjunction with the guide members 114 will be described in greater detail in the following embodiments. In some embodiments, the one or more guide members 114 may correspond to slots or provisions for alignment of the at least one movable lever 110 along the axis defined by the first pivoting mechanism 106 and the second pivoting mechanism 108. The at least one movable lever 110, the at least one handle 112, and the one or more guide members 114 are described later in greater detail in conjunction with FIGS. 2A and 2B.

The first pivoting mechanism 106 and the second pivoting mechanism 108 enables the user to open the detachable cover 104 in a first opening direction and a second opening direction, respectively. The first opening direction may correspond to a top direction movement of the detachable cover 104 and the second opening direction may correspond to a sideward direction movement of the detachable cover 104. It may be noted that a user may either open the detachable cover 104 in the first opening direction or the second opening direction, based on the available buffer space around the printer 100. It may be noted that opening or detaching the detachable cover 104 from the printer 100 may provide an access of inside of the printer 100 for the user to perform maintenance or other operations. In some embodiments, the opening of the detachable cover 104 may be facilitated in a bifold configuration or a non-bifold i.e., one-piece configuration. The bifold configuration or the non-bifold configuration are described later in greater detail in conjunction with FIGS. 6A-7B.

Referring to FIG. 2A, an isometric view of the printer 100 with the disengaged detachable cover 104, is disclosed. FIG. 2A is described in conjunction with FIG. 2B.

The base unit 102 may comprise a printing mechanism 200. The printing mechanism 200 may be configured to provide a text and graphical output to a user. The printing mechanism 200 includes a ribbon rewind 202, a ribbon supply 204, a media door (also termed as the detachable cover 104), a media supply 206, a rewinder 208, and a print engine 210. The ribbon rewind 202 and the ribbon supply 204 may carry a thin band of material made up of panels and a printing ink of either a single solid color or various colors of dye. In some embodiments, the supplied printing ink may be directly applied to a printing surface such as a paper, card etc.

In some embodiments, the media supply 206 may be configured to feed a media including paper, cards, newspapers etc. over which printing is to be executed. Further, the rewinder 208 may be configured to automatically rewind labels into roll, as the labels come out of the printer 100, of different diameters. In some embodiments, the rewinder 208 may be configured to make printing large batches of labels efficient. Further, the print engine 210 may be configured to execute actual printing.

Referring to FIGS. 2A-2B, the first pivoting mechanism 106 and the second pivoting mechanism 108 may comprise a first set of hinges 212, the at least one movable lever 110, the at least one handle 112, a knob (not shown), the one or more guide members 114, and a second set of hinges 214. It may be noted that the first set of hinges 212 may be fabricated over the detachable cover 104 and second set of hinges 214 may be fabricated over the base unit 102. In some embodiments, the at least one movable lever 110 may be coupled to the at least one handle 112 at a first end and to at least one spring 216 at a second end. Further, the at least one handle 112 may be configured to provide the translational movement to the at least one movable lever 110. Further, the at least one spring 216 may be configured to extend or retract, for the movement of the detachable cover 104.

In some embodiments, the at least one movable lever 110 may be fabricated with the knob. The operation of the knob is described in greater detail in conjunction with FIGS. 8A-9B. As discussed, the one or more guide members 114 may be fabricated over the at least one movable lever 110 to ensure movement and alignment of the first pivoting mechanism 106 and the second pivoting mechanism 108. In some embodiments, the one or more guide members 114 may be provisions or slots fabricated over the at least one movable lever 110. Such slots may facilitate alignment of the first pivoting mechanism 106 and the second pivoting mechanism 108 of the detachable cover 104 with the base unit 102. The working of the first pivoting mechanism 106 and the second pivoting mechanism 108 with respect to the second set of hinges 214 is described in conjunction with FIGS. 3A-5B.

FIGS. 3A-3B illustrate the first pivoting mechanism 106 and the second pivoting mechanism 108 in an engaged position and in a disengaged position (media door not shown), according to an embodiment. FIGS. 3A-3B are illustrated and described in conjunction with FIGS. 4-5B.

In some embodiments, the engaged position of the first pivoting mechanism 106 and the second pivoting mechanism 108 may result in interlocking of the first set of hinges 212 with the second set of hinges 214. In order to facilitate the movement of the first set of hinges 212 towards the second set of hinges 214, the handles 112 may slide in opposite direction from each other due to the retraction of the at least one spring 216, as shown in FIGS. 3A, 4, and 5A. In some embodiments, the first set of hinges 212 may be defined as a female member having a cylindrical cavity. In some embodiments, the second set of hinges 214 may be defined as a male member having an elongated portion. As the first set of hinges 212 slides towards the second set of hinges 214, the female member envelops the male member, to allow interlocking of the first set of hinges 212 with the second set of hinges 214. Such position locks the movement of the detachable cover 104 with respect to the base unit 102. It will be apparent to a person skilled in the art to identify the engagement of the first set of hinges 212 and the second set of hinges 214 using the retraction of the spring 216 by the handles 112.

Referring to FIG. 3B, the disengaged position of the first pivoting mechanism 106 and the second pivoting mechanism 108 may result in unlocking of the first set of hinges 212 from the second set of hinges 214. In order to facilitate the movement of the first set of hinges 212 away from the second set of hinges 214, the handles 112 may be pressed by the user towards each other that may result in extension of the at least one spring 216, as shown in FIGS. 3B and 5B. As the first set of hinges 212 slides away from the second set of hinges 214, the female member uncovers the male member, to allow unlocking of the first set of hinges 212 from the second set of hinges 214. Such position unlocks the detachable cover 104 from the base unit 102. It will be apparent to a person skilled in the art to identify the disengagement of the first set of hinges 212 and the second set of hinges 214 using the extension of the at least one spring 216 by the handles 112.

In some embodiments, a plurality of pins 402 may be integral to the detachable cover 102 such that the plurality of pins 402 may be positioned within the one or more guide members 114. In some embodiments, the plurality of pins 402 may allow the one or more guide members 114 to reciprocate along the planar path of the at least one movable lever 110. In some embodiments, a plurality of anchor points 404 may be integrated to the detachable cover 102 such that one side of the at least one spring 216 may be connected to the plurality of anchor points 404 and other side of the at least one spring 216 may be attached to the at least one movable lever 110. Further, the plurality of anchor points 404 may be configured to fixedly connect the at least one spring 216 with the detachable cover 102. Such fixed attachment of the at least one spring 216 with the detachable cover 102 may allow the at least one spring 216 to extend or retract along the movement of the at least one movable lever 102.

FIG. 6A illustrates a side view of the printer 100 with a top direction opening of the detachable cover 104, in accordance with the present disclosure. FIG. 6A is described in conjunction with FIG. 6B.

In some embodiments, the first pivoting mechanism 106 may be configured to facilitate the movement of the detachable cover 104 in a first pivoting axis 602. The first pivoting axis 602 may be defined as an arc created by the detachable cover 104 while opening in the first opening direction, i.e., top direction movement of the detachable cover 104 with respect to the base unit 102. In some instances, if the user has negligible space on either sides of the printer 100, then the detachable cover 104 may be opened in the first opening direction, as shown in FIG. 6A. In order to detach the detachable cover 104, the at least one handle 112 of the second pivoting mechanism 108 may be pressed by the user. The pressing of the at least one handle 112 may result in translational movement of the at least one movable lever 110. The movement of the at least one movable lever 110 may further disengage the first set of hinges 212 of the second pivoting mechanism 108 from the second set of hinges 214 of the base unit 102. It may be noted that the detachable cover 104 may remain attached with the base unit 102 via the first pivoting mechanism 106, as shown in FIG. 6B. Therefore, the detachable cover 104 may be pivoted about the first pivoting axis 602 defined by the first pivoting mechanism 106 for moving the detachable cover 104 in the first opening direction.

FIG. 7A illustrates a side view of the printer 100 with sideward direction opening of the detachable cover 104, in accordance with the present disclosure. FIG. 7A is described in conjunction with FIG. 7B.

In some embodiments, the second pivoting mechanism 108 may be configured to facilitate the movement of the detachable cover 104 in a second pivoting axis 702. The second pivoting axis 702 may be defined as an arc created by the detachable cover 104 while opening in the second opening direction i.e., sideward direction movement of the detachable cover 104 with respect to the base unit 102. In some instances, if the user has negligible space at an upper side of the printer 100 and enough space on either side of the printer 100, then the detachable cover 104 may be opened in the second opening direction, as shown in FIG. 7A. In order to detach the detachable cover 104, the at least one handle 112 of the first pivoting mechanism 106 may be pressed by the user. The pressing of the at least one handle 112 may result in translational movement of the at least one movable lever 110. The movement of the at least one movable lever 110 may further disengage the first set of hinges 212 of the first pivoting mechanism from the second set of hinges 214. It may be noted that the detachable cover 104 may remain attached with the base unit 102 via the second pivoting mechanism 108, as shown in FIG. 7B. Therefore, the detachable cover 104 may be pivoted about the second pivoting axis 702 defined by the second pivoting mechanism 108 for moving the detachable cover 104 in the second opening direction.

It will be apparent to one skilled in the art that above-mentioned mechanism of opening the detachable cover 104 with respect to the based unit 102 have been provided only for illustration purposes, without departing from the scope of the disclosure.

FIGS. 8A-8B illustrate an oblique view of a knob 802 coupled with a rack and pinion mechanism, in accordance with the present disclosure. FIGS. 8A-8B are described in conjunction with FIGS. 1 and 8C-9B.

In some embodiments, the at least one movable lever 110 may be configured to be operated by the user with the help of the knob 802. The knob 802 may be engaged with the at least one movable lever 110. In some embodiments, the knob 802 may be configured to engage the first set of hinges 212 of the first pivoting mechanism 106 and the second pivoting mechanism 108 with the second set of hinges 214 of the base unit 102. In some embodiments, counterclockwise rotation of the knob 802 may also facilitate translational movement to the at least one movable lever 110, to engage the first set of hinges 212 with the second set of hinges 214. In some embodiments, the at least one movable lever 110 may be attached to the detachable cover 104 with the help of the plurality of pins 402.

In some embodiments, the knob 802 may be configured to disengage the first set of hinges 212 of the first pivoting mechanism 106 and the second pivoting mechanism 108 from the second set of hinges 214 of the base unit 102. In some embodiments, the clockwise rotation of the knob 802 may facilitate translational movement to the at least one movable lever 110. As discussed above, the translational movement of the at least one movable lever 110 may allow the first set of hinges 212 to disengage with the second set of hinges 214.

In some embodiments, the knob 802 may comprise at least two sets of gear teeth, i.e., a first set of gear teeth 804 and a second set of gear teeth 812, as shown in FIG. 8B (media door not shown). In some embodiments, the first set of gear teeth 804 may provide a firm grip to the user to hold on to the knob 802 while rotating. In some embodiments, the second set of gear teeth 812 may be meshed in between the at least one movable lever 110. In some embodiments, the at least one movable lever 110 may comprise a rack 806 having a third set of gear teeth 808. In some embodiments, the third set of gear teeth 808 of the rack 806 may receive the second set of gear teeth 812. For example, two movable levers may be provided with each having a rack and set of teeth to receive the second set of gear teeth 812. Therefore, when the knob 802 is rotated via the first set of gear teeth 804 in either clockwise or counterclockwise, the two movable levers may move parallel and opposite to each other in the same plane. Such mechanism of the rack 806 having the third set of gear teeth 808 and the knob 802 having the second set of gear teeth 812, may be referred as the rack and pinion mechanism.

In some embodiments, the knob 802 may comprise a grooved section 810 integrated over a surface of the knob 802. The grooved section 810 may correspond to an arrow to show rotation i.e., the clockwise rotation of the knob 802 and thereby to disengage the first set of hinges 212 from the second set of hinges 214.

Further, the knob 802 may be engaged with the at least one movable lever 110 such that the detachable cover 104 may be positioned in between the first set of gear teeth 804 and the second set of gear teeth 812, as shown in FIG. 8D. In some embodiments, the knob 802 may be coupled with the detachable cover 104 using a screw 814 as shown in FIG. 8D. The screw 814 may be inserted via a hole 902 fabricated on other surface of the knob 802 towards the second set of gear teeth 812 as shown in FIG. 9A. In some embodiments, the screw 814 may be detachable from the hole 902 to remove the knob 802 from the detachable cover 104, without departing from the scope of the disclosure.

FIG. 8E illustrates an oblique view of the knob 802 coupled with at least one torsion spring 816 (media door not shown). FIG. 8E is described in conjunction with FIGS. 8A-8D.

In some exemplary embodiments, the at least one torsion spring 816 may be attached to the knob 802. The at least one torsion spring 816 may facilitate the knob 802 to keep the first set of hinges 212 engaged with the second set of hinges 214. It may be noted that one end of the at least one torsion spring 816 may be attached to the knob 802 and another end of the at least one torsion spring 816 may be attached with the detachable cover 104. In some embodiments, the rotation of the knob 802 by the user in clockwise direction may stretch the at least one torsion spring 816 and disengage the first set of hinges 212 from the second set of hinges 214. Further, once the knob 802 released by the user, the at least one torsion spring 816 may further facilitate rotation of the knob 802 in anti-clockwise direction and thereby engage the first set of hinges 212 with the second set of hinges 214. The torsion spring 816 may thereby eliminate any accidental opening of the detachable cover 104.

FIGS. 10A-10B illustrate side views of the printer 100 with comparison between bifold opening and non-bifold opening of the detachable cover 104, in accordance with the present disclosure.

The detachable cover 104 may open in a bifold configuration or a non-bifold configuration in the first opening direction, as shown in FIG. 10A. In some embodiments, the detachable cover 104 may open in a bifold configuration or a non-bifold configuration in the second opening direction. The non-bifold configuration may correspond to opening of the detachable cover 104 as a single piece. In some embodiments, the non-bifold configuration may also be referred as one-piece configuration. The detachable cover 104 may open in the non-bifold configuration along the first opening direction. Such opening of the detachable cover 104 in the non-bifold configuration may create an arc, shown by A1. In some other embodiments, the detachable cover 104 may open in the bifold configuration along the first opening direction. Such opening of the detachable cover 104 in the bifold configuration, may create an arc, shown by A2. It may be noted that the radius of arc A1 is greater than the radius of arc A2. Thus, in the case of the non-bifold configuration, the detachable cover 104 may utilize more outside space in comparison to the bifold configuration.

For example, the user wants to open the detachable cover 104 in the first opening direction i.e., the top direction movement since the user has space constraint on sides of the printer 100. By using the second pivoting mechanism 108, the detachable cover 104 is opened in the non-bifold configuration. The detachable cover 104, when opened partially in the non-bifold configuration, creates an arc radius of 360 mm from the first pivoting mechanism 106. Further, when the detachable cover 104 is completely opened in the first opening direction, creates an arc radius of 576 mm from the first pivoting mechanism 106. Alternatively, by using the second pivoting mechanism 108, the detachable cover 104 is opened in the bifold configuration. The detachable cover 104 when opened partially in the bifold configuration creates an arc radius of 279 mm from the first pivoting mechanism 106. Further, when the detachable cover 104 is completely opened in the bifold configuration, creates an arc radius of 476 mm from the first pivoting mechanism 106. Therefore, the non-bifold configuration utilizes more space than the bifold configuration. In some embodiments, the bifold configuration of the detachable cover 104 may be useful in situations where limited space is available and the non-bifold configuration may be useful in situation where the detachable cover 104 is required to be opened fully.

As discussed, the detachable cover 104 may open in the bifold configuration or the non-bifold configuration in the second opening direction, as shown in FIG. 10C. In some embodiments, the second opening direction may correspond to the sideward direction movement of the detachable cover 104. The detachable cover 104 may open in the non-bifold configuration along the second opening direction. Such opening of the detachable cover 104 in the non-bifold configuration may create an arc, shown by A3, in FIG. 10C. It may be noted that the detachable cover 104 may utilize more outside space in the non-bifold configuration in comparison to the bifold configuration. The detachable cover 104 may be detached from the first pivoting mechanism 106 and kept engaged in the second pivoting mechanism 108. The opening of the detachable cover 104 in the second opening direction may save volume of space on the side of the printer 100. Further, the opening of the detachable cover 104 in the bifold configuration and the non-bifold configuration may be required where there is a limited space towards the top of the printer 100. It may be noted that the bifold configuration and the non-bifold configuration for the second opening direction of the detachable cover 104, as shown in FIG. 10C, may work in a similar fashion as discussed above in conjunction with FIGS. 10A-10B, without departing from the scope of the disclosure.

As will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module", "system" or "sub-system." In addition, aspects of the present disclosure may take the form of a computer program product embodied in one or more computer readable medium(s) having computer readable program code embodied thereon.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A printer comprising:

a base unit defining a storage compartment configured to house a printing mechanism of the printer; and a detachable cover attached to the base unit via a first pivoting mechanism and a second pivoting mechanism, wherein the detachable cover is configured to be pivoted about a first pivoting axis defined by the first pivoting mechanism for moving the detachable cover in a first opening direction when the detachable cover is detached from the second pivoting mechanism, and wherein the detachable cover is configured to be pivoted about a second pivoting axis defined by the second pivoting mechanism for moving the detachable cover in a second opening direction different from the first opening direction when the detachable cover is detached from the first pivoting mechanism.

2. The printer of claim 1, wherein the first opening direction and the second opening direction correspond to a top direction movement and a sideward direction movement of the detachable cover with respect to the base unit, respectively.

3. The printer of claim 1, wherein the detachable cover opens in a bifold configuration or a non-bifold configuration.

4. The printer of claim 1, wherein each of the first pivoting mechanism and the second pivoting mechanism includes one or more hinges.

5. The printer of claim 4, wherein the first pivoting mechanism facilitates the one or more hinges to move the detachable cover in the first opening direction.

6. The printer of claim 4, wherein the second pivoting mechanism facilitates the one or more hinges to move the detachable cover in the second opening direction.

7. The printer of claim 1, wherein each of the first pivoting mechanism and the second pivoting mechanism includes at least one movable lever having a first end coupled to at least one handle and a second end coupled to at least one spring.

8. The printer of claim 7, wherein the detachable cover is configured to be moved in the first opening direction by disengaging one or more hinges of the second pivoting mechanism by the at least one handle.

9. The printer of claim 7, wherein the detachable cover is configured to be moved in the second opening direction by disengaging one or more hinges of the first pivoting mechanism by the at least one handle.

10. The printer of claim 7, wherein the at least one spring is configured to extend or retract, for the movement of the detachable cover.

11. The printer of claim 7, wherein the detachable cover having one or more guide members integrated on the at least one movable lever to ensure movement and alignment of the first pivoting mechanism and the second pivoting mechanism.

* * * * *